US010323330B2

(12) United States Patent
Takahashi et al.

(10) Patent No.: US 10,323,330 B2
(45) Date of Patent: Jun. 18, 2019

(54) METHOD OF RECOVERING NUCLEAR FUEL MATERIAL (71) Applicant: Kabushiki Kaisha Toshiba, Tokyo (JP)

(72) Inventors: Yuya Takahashi, Kanagawa (JP); Koji Mizuguchi, Kanagawa (JP); Reiko Fujita, Tokyo (JP); Hitoshi Nakamura, Kanagawa (JP); Shohei Kanamura, Kanagawa (JP); Naoki Kishimoto, Aomori (JP); Yoshikazu Matsubayashi, Kanagawa (JP); Takashi Oomori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/696,275

(22) Filed: Sep. 6, 2017

(65) Prior Publication Data
US 2018/0051381 A1 Feb. 22, 2018

Related U.S. Application Data (62) Division of application No. 13/899,978, filed on May 22, 2013, now Pat. No. 9,845,542.

(30) Foreign Application Priority Data

Jun. 15, 2012 (JP) .................................. 2012-135348

(51) Int. Cl.
*C22B 5/04* (2006.01)
*C22B 5/18* (2006.01)
(Continued)

(52) U.S. Cl.
CPC ................ *C25C 7/005* (2013.01); *C22B 5/04* (2013.01); *C22B 5/18* (2013.01); *C22B 60/0213* (2013.01);
(Continued)

(58) Field of Classification Search
CPC . C22B 60/0213; C22B 60/04; C22B 60/0291; C22B 5/04; C22B 5/18; C25C 3/34; Y02W 30/88
(Continued)

(56) References Cited

U.S. PATENT DOCUMENTS 2,951,793 A   9/1960 Hansen
2,994,650 A   8/1961 Slatin
(Continued)

FOREIGN PATENT DOCUMENTS

JP   3-75589 A   3/1991
JP   5-59463     3/1993
(Continued)

OTHER PUBLICATIONS

Office Action dated Aug. 25, 2015, in Japanese Patent Application No. 2012-135348.

*Primary Examiner* — Tima M McGuthry-Banks
(74) *Attorney, Agent, or Firm* — Oblon, McClelland, Maier & Neustadt, L.L.P.

(57) ABSTRACT

According to an embodiment, a nuclear fuel material recovery method of recovering a nuclear fuel material containing thorium metal by reprocessing an oxide of a nuclear fuel material containing thorium oxide in a spent fuel is provided. The method has: a first electrolytic reduction step of electrolytically reducing thorium oxide in a first molten salt of alkaline-earth metal halide; a first reduction product washing step of washing a reduction product; and a main electrolytic separation step of separating the reduction product. The first molten salt further contains alkali metal halide, and contains at least one out of a group consisting of calcium chloride, magnesium chloride, calcium fluoride and magnesium fluoride. The method may further has a second electrolytic reduction step of electrolytically reducing uranium (Continued)

oxide, plutonium oxide, and minor actinoid oxide in a second molten salt of alkali metal halide.

4 Claims, 9 Drawing Sheets

(51) Int. Cl.
*C25C 3/34* (2006.01)
*C22B 60/02* (2006.01)
*C25C 7/00* (2006.01)
*G21C 19/46* (2006.01)

(52) U.S. Cl.
CPC ............ *C22B 60/0291* (2013.01); *C25C 3/34* (2013.01); *G21C 19/46* (2013.01); *Y02W 30/883* (2015.05)

(58) Field of Classification Search
USPC .......................................... 75/395, 397, 399
See application file for complete search history.

(56) References Cited

U.S. PATENT DOCUMENTS

| | | | | |
|---|---|---|---|---|
| 3,110,555 | A * | 11/1963 | Shaffer | C01G 99/006 423/11 |
| 3,169,057 | A * | 2/1965 | Knighton | C22B 59/00 75/396 |
| 3,982,928 | A * | 9/1976 | Chiotti | C22B 60/0286 75/399 |
| 5,141,723 | A | 8/1992 | Miller et al. | |
| 5,160,367 | A * | 11/1992 | Pierce | C22B 60/0213 423/155 |
| 5,211,742 | A * | 5/1993 | Amamoto | C22B 60/0213 75/398 |
| 5,290,337 | A | 3/1994 | Sharma | |
| 5,356,605 | A * | 10/1994 | Tomczuk | C01G 43/08 423/251 |
| 5,454,914 | A * | 10/1995 | Gay | C22B 59/00 205/368 |
| 7,390,392 | B1 | 6/2008 | Choi et al. | |
| 2004/0244533 | A1 | 12/2004 | Lewin et al. | |
| 2012/0132034 | A1* | 5/2012 | Saegusa | C01B 33/037 75/392 |

FOREIGN PATENT DOCUMENTS

| | | |
|---|---|---|
| JP | 2000-131489 A | 5/2000 |
| JP | 3199937 | 6/2001 |
| JP | 3486044 | 10/2003 |
| JP | 3763980 | 1/2006 |
| JP | 4089944 | 3/2008 |
| JP | 2008-134096 A | 6/2008 |

* cited by examiner

METHOD OF RECOVERING NUCLEAR FUEL MATERIAL

CROSS-REFERENCE TO RELATED APPLICATION

The present application is a divisional of U.S. patent application Ser. No. 13/899,978, which is based upon and claims the benefit of priority from Japanese Patent Application No. 2012-135348, filed Jun. 15, 2012, the entire content of which are incorporated herein by reference.

FIELD

Embodiments described herein relate to a method of recovering a nuclear fuel material.

BACKGROUND

From the viewpoint of resources and reduction of environmental loads, the use of a thorium fuel has been studied. Almost all of natural thorium exists as thorium-232. Thorium-232 absorbs neutrons, and is transformed into uranium-233 through nuclear transmutation. Uranium-233 is a fissionable nuclide, and therefore can be used as a nuclear fuel.

Reserves of thorium are larger than uranium. Therefore, the use of the thorium fuel can reduce the risk of resource depletion. Furthermore, the thorium fuel generates smaller amounts of high-radiotoxicity transuranic nuclides (TRU) than the uranium fuel. As a result, it is considered that the thorium fuel is able to reduce environmental loads.

There are reports that a cycle with the use of the thorium fuel is effective in breeding of uranium-233 in light-water reactors and fast reactors, as well as in transmuting of TRU generated by a conventional uranium fuel cycle.

What is required to make effective use of the thorium fuel cycle is a reprocessing technology to refine a nuclear fuel material from a thorium fuel. Therefore, what is required is processing a metal or metal oxide and recovering separately. Moreover, as for plutonium, the use of the technology of separately recovering plutonium comes with the issue of preventing nuclear proliferation. Therefore, the process requires a high degree of nuclear proliferation resistance so as not to allow plutonium to be recovered separately.

As for the method of processing a uranium oxide fuel that has been used as a nuclear fuel of a conventional light water reactor, the following methods have been developed: a reduction method of uranium oxide, and a method of recovering uranium, plutonium and minor actinoids. As for the method of reprocessing the light water reactor fuel, as a method of reducing uranium oxide to metal, the following methods have been developed: a chemical reduction method, which uses a reducing agent, and an electrolytic reduction method.

As for the chemical reduction method, as disclosed in Japanese Patent No. 3,763,980, the following method is available: the method of using metallic lithium as a reducing agent, and making it react with uranium, plutonium, and minor actinoids in a molten salt to reduce to metals, and recovering the metals of uranium, plutonium, and minor actinoids that are produced by the reduction.

As for the electrolytic reduction method, as disclosed in Japanese Patent No. 4,089,944, the following method is available: the method of using lithium chloride, potassium chloride, and the eutectic salt of lithium chloride and potassium chloride for an electrolytic bath to carry out electrolytic reduction of a spent oxide fuel.

Moreover, as disclosed in Japanese Patent No. 3,199,937 and Japanese Patent No. 3,486,044, the following method is available: the method of carrying out electrolytic separation of a metal fuel that is obtained by reduction, or a spent metal fuel, in an electrolysis tank that stores a molten salt phase and a metallic phase to recover the metals of uranium, plutonium, and minor actinoids.

As for the method of recovering a nuclear fuel material pertaining to uranium oxide, for uranium, plutonium, and minor actinoids, the following methods are available: a method of reduction in a molten salt, and a method of recovering by electrolysis in a molten salt. For thorium oxide, no method has been established to recover a nuclear fuel material.

If a nuclear fuel material is recovered in a similar way to that for uranium oxide, reduction cannot take place in the case of a chemical reduction method that uses metallic lithium because the thorium oxide is stable. Accordingly, it is difficult to carry out electrolytic reduction of thorium oxide with the use of lithium chloride, potassium chloride, and the eutectic salt of lithium chloride and potassium chloride. Thus, the problem is that the thorium metal cannot be recovered from the thorium oxide.

DETAILED DESCRIPTION

The object of the present embodiment, therefore, is to provide a method of carrying out reduction of a thorium oxide to recover thorium metal.

According to an embodiment, there is provided a nuclear fuel material recovery method of recovering a nuclear fuel material containing thorium metal by reprocessing an oxide of a nuclear fuel material containing thorium oxide in a spent fuel, the method comprising: a first electrolytic reduction step of electrolytically reducing the thorium oxide in a first molten salt of alkaline-earth metal halide; a first reduction product washing step of washing, after the first electrolytic reduction step, a reduction product obtained by the first electrolytic reduction step; and a main separation step of separating the reduction product, after the first reduction product washing step.

According to another embodiment, there is provided a nuclear fuel material recovery method of recovering a nuclear fuel material containing thorium metal by reprocessing an oxide of a nuclear fuel material containing thorium oxide in a spent fuel, the method comprising: a first chemical reduction step of carrying out chemical reduction by letting the thorium oxide react with a first chemical reducing agent to produce thorium metal; and a separation step of carrying out separation and refining of the thorium metal after the first chemical reduction step.

The following describes a method of recovering a nuclear fuel material according to embodiments of the present invention, with reference to the accompanying drawings. The same, or similar, portions are represented by the same reference symbols, and duplicate descriptions will be omitted.

[First Embodiment]

Figure 1:
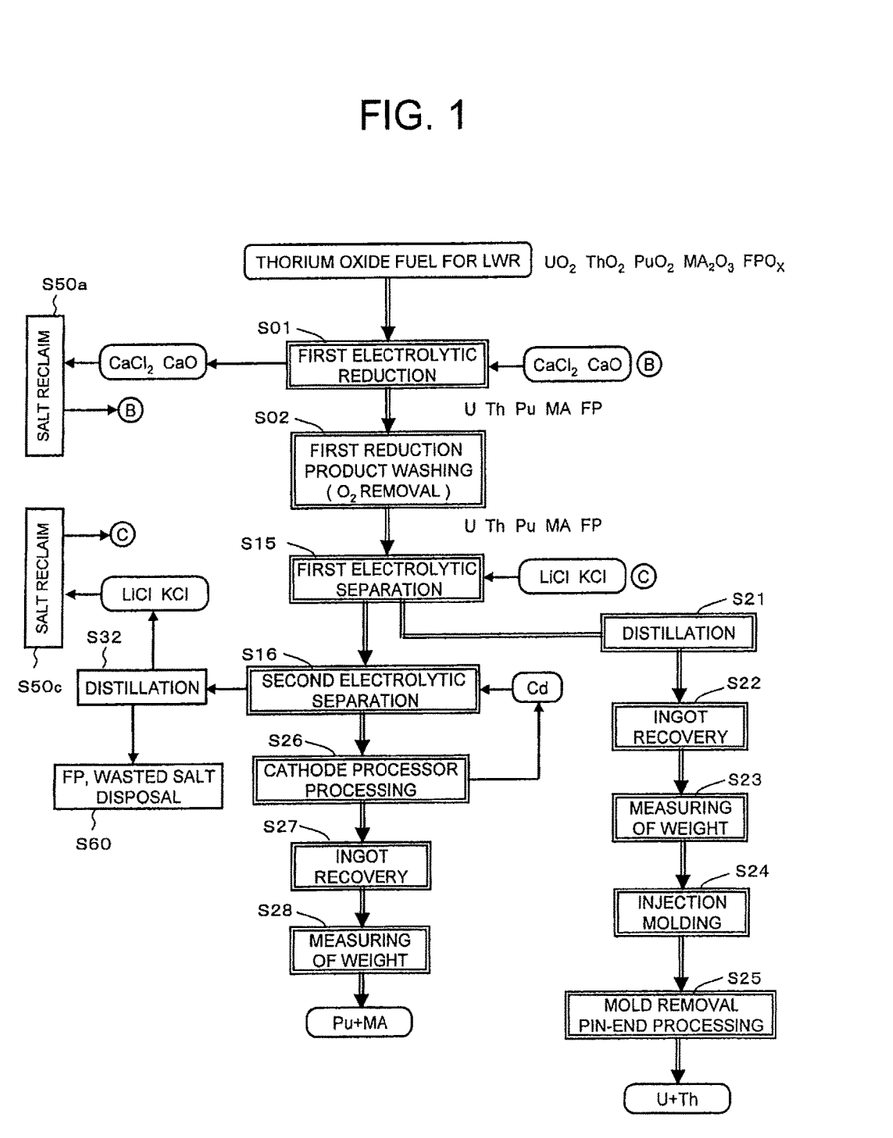
FIG. 1 is a flowchart showing a flow of a process of a method of recovering a nuclear fuel material according to a first embodiment of the invention.

FIG. 1 is a flowchart showing a flow of a process of a method of recovering a nuclear fuel material according to a first embodiment of the invention.

A spent Th oxide fuel for a light water reactor (referred to as "spent thorium fuel, " hereinafter) contains uranium dioxide (also referred to as "$UO_2$," hereinafter), thorium dioxide (also referred to as "$ThO_2$," hereinafter), plutonium dioxide (also referred to as "$PuO_2$," hereinafter), minor actinoid oxide (also referred to as "$MA_2O_3$," hereinafter), and fission product oxide (also referred to as "$FPO_x$," hereinafter). That is, the above substances are present in the form of oxide. Incidentally, the minor actinoids contain many trivalent elements, and are therefore written $MA_2O_3$, represented by trivalent elements.

At a first electrolytic reduction step, the following substance is referred to as a first molten salt: calcium chloride (also referred to as "$CaCl_2$," hereinafter), or calcium oxide (also referred to as "CaO, " hereinafter), or a mixture of calcium chloride and calcium oxide. Calcium oxide is an oxide, not a salt; it cannot be said that a mixture of calcium oxide that has melted with a molten salt of calcium chloride is exactly a molten salt. However, for descriptive convenience, the above substances are collectively referred to as molten salt (The same is true for the embodiments described later).

Figure 3:
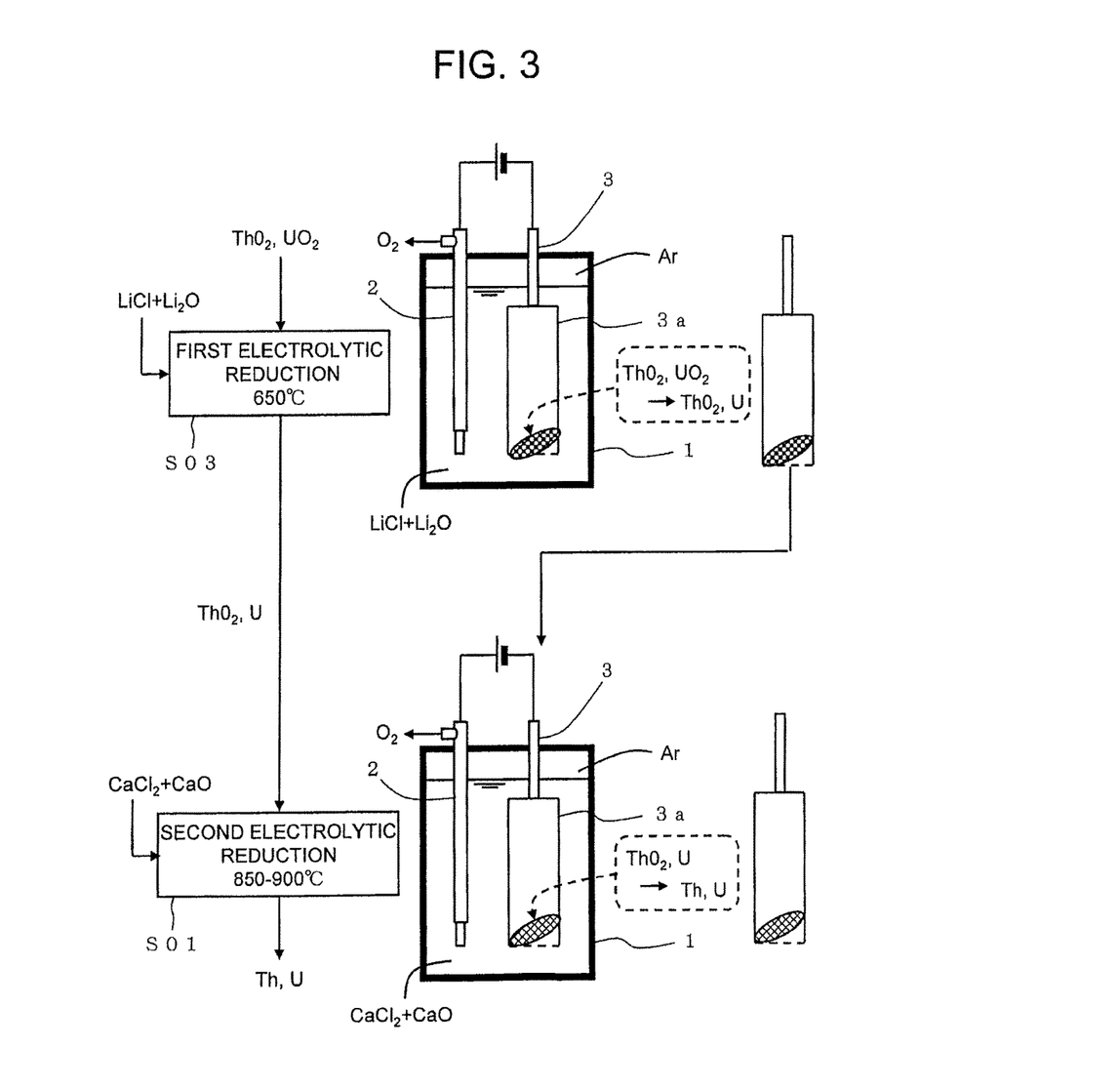
FIG. 3 is a flowchart showing an electrolytic reduction process of the process of the method of recovering a nuclear fuel material according to the second embodiment of the invention, as well as a conceptual cross-sectional view of the inside of a reactor vessel.

In the first molten salt, a spent thorium fuel is put into a cathode basket 3a shown in FIG. 3, and electrolysis is carried out to perform electrolytic reduction of each component in the spent thorium fuel (First electrolytic reduction step S01).

As a result, in the molten salt, oxides in the spent thorium fuel are respectively turned into the following substances: metal-state uranium (also referred to as "U, " hereinafter); thorium (also referred to as "Th," hereinafter); plutonium (also referred to as "Pu," hereinafter); minor actinoids (also referred to as "MA," hereinafter); and fission product oxide that is obtained by reduction (also referred to as "FP," hereinafter).

In this case, the first molten salt is not limited only to calcium chloride, calcium oxide, or a mixed salt of calcium chloride and calcium oxide. Instead, the first molten salt may contain at least one of the following substances: calcium chloride, magnesium chloride, calcium fluoride, and magnesium fluoride. The first molten salt may also contain other alkaline-earth metal halides. Furthermore, the first molten salt may contain an alkali metal halide. It is desirable that the temperature of the molten salt be about 850 degrees Celsius to about 900 degrees Celsius.

At a first reduction product washing step, after step S01, each metal that is obtained by reduction at step S01 is washed to remove oxygen (S02).

After step S02, a main separation step is started to carry out refining and separation of each metal.

First, a first electrolytic separation is carried out. That is, electrolysis is carried out in a molten salt of lithium chloride (also referred to as "LiCl," hereinafter), potassium chloride (also referred to as "KCl, " hereinafter), or a mixture of lithium chloride and potassium chloride. As a result of the electrolysis, uranium and thorium are deposited on the anode side. That is, the above substances are separated in a metal state (S15).

In this case, the molten salt used at the first electrolytic separation step may contain calcium chloride, magnesium chloride, calcium fluoride or magnesium fluoride; or a combination of the above substances. Furthermore, the molten salt may contain an alkali metal halide.

After step S15, first, uranium and thorium, which are separated in a metal state, are transferred to another reactor vessel. After being transferred to another reactor vessel, uranium and thorium are distilled (S21), and an ingot of uranium and thorium is recovered (S22).

After step S22, the weight of uranium and thorium recovered is measured (S23). After step S23, in order to produce a fuel, injection molding is carried out (S24). A process of mold removal and pin-end processing (S25) is carried out. In this manner, a metal fuel that is made of a mixture of uranium and thorium can be obtained.

After step S15, for the plutonium and MA that have been separated from the uranium and thorium remaining in the cathode basket 3a, and transferred to another reactor vessel, a second electrolytic separation is carried out (S16).

The second electrolytic separation is carried out after molten cadmium is injected into the molten salt, and the lower part of the reactor vessel 1 is filled with the molten cadmium. In an anode basket, plutonium and MA are stored; cadmium is placed on a cathode side as the process is carried out. Incidentally, in this case, the system is not limited to a method of directly putting the molten cadmium into the reactor vessel 1. At a cathode side, a cadmium basket may be provided; cadmium may be put into the cadmium basket. According to the above configuration, electrolysis is carried out, and an electrolytic separation enables plutonium and MA to be collected in the cathode-side cadmium (S16).

After step S16, a molten salt and cadmium are distilled by a cathode processor (S26), and the ingot of the metals is recovered (S27). The weight thereof is measured (S28), and plutonium and MA are obtained.

Incidentally, the molten salt that is used at each step is reclaimed and reused. That is, the first molten salt that is used during the first electrolytic reduction (S01) is reclaimed by a salt reclaim step (S50a). The molten salt that is used during the second electrolytic separation is separated by distillation from impurities such as FP (S32), and then is reclaimed by a salt reclaim step (S50c). Moreover, cadmium is distilled by a cathode processor and reclaimed (S26) and reused.

The FP and waste salt that result from the cathode processor step S26 and the salt reclaim steps S50a and S50c are treated as wastes, and are subjected to disposal such as a glassification and other processes (S60).

As described above, according to the present embodiment, in the same reactor vessel, oxides of a spent thorium fuel are reduced at once. Therefore, the steps are simplified, and a fewer types of molten salt are required.

Moreover, a combination of uranium metal and thorium metal is separated from a combination of MA and plutonium metal when the two combinations are recovered. Therefore, the above substances can be mixed at a predetermined ratio, and a fuel whose concentration has been adjusted can be produced.

As described above, each of the components, including thorium metal, can be recovered in the form of metal.

[Second Embodiment]

Figure 2:
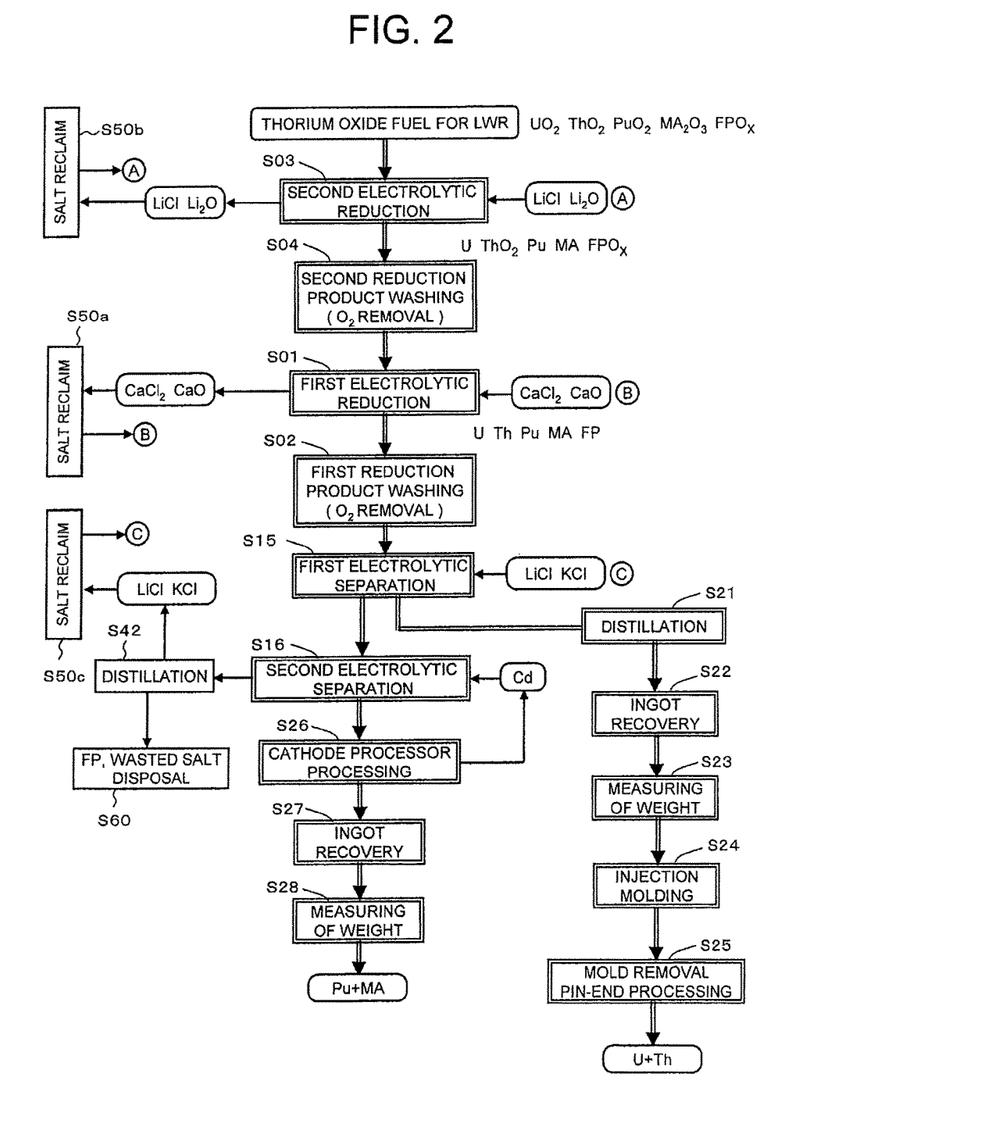
FIG. 2 is a flowchart showing a flow of a process of a method of recovering a nuclear fuel material according to a second embodiment of the invention.

FIG. 2 is a flowchart showing a flow of a process of a method of recovering a nuclear fuel material according to a second embodiment of the present invention. The present embodiment is a variant of the first embodiment: Before the first electrolytic reduction step S01, a second electrolytic reduction step S03 and a second reduction product washing step S04 are added.

That is, for a spent thorium fuel, the second electrolytic reduction step S03 and the second reduction product washing step S04 are carried out. After that, as in the case of the first embodiment, the first electrolytic reduction step S01 and the subsequent steps are carried out.

First, the second electrolytic reduction is carried out (S03). That is, in a molten salt of lithium chloride, lithium oxide, or a mixture of lithium chloride and lithium oxide, electrolysis is carried out. As a result of the electrolysis, uranium dioxide, plutonium dioxide, and oxides of MA are mainly reduced, and uranium, plutonium, and MA are deposited on an anode side. That is, the above substances are reduced to metals.

In this case, the second molten salt that is used at the second electrolytic reduction step S03 may contain any alkali metal halide other than lithium chloride. The second molten salt may further contain any alkaline-earth metal halide other than calcium chloride, magnesium chloride, calcium fluoride and magnesium fluoride. It is desirable that the temperature of the molten salt be around 650 degrees Celsius. Moreover, the molten salt that is used at the second electrolytic reduction step S03 is reclaimed for reuse. That is, the second molten salt that is used during the second electrolytic reduction (S03) is reclaimed by a salt reclaim step (S50b).

FIG. 3 is a flowchart showing an electrolytic reduction process of the process of the method of recovering a nuclear fuel material according to the second embodiment of the invention, as well as a conceptual cross-sectional view of the inside of a reactor vessel 1. More specifically, FIG. 3 shows main steps, i.e. the second electrolytic reduction step S03 and the first electrolytic reduction step S01. As for oxides in a spent thorium fuel, only thorium oxide and uranium dioxide, which behave differently during the electrolysis, are shown.

First, the second electrolytic reduction step S03 is carried out in a reactor vessel 1 that contains a molten salt of about 650 degrees Celsius of lithium chloride and lithium oxide. Into a cathode basket 3a that is on the side of a cathode electrode 3, a spent thorium fuel, which includes mainly $ThO_2$ and $UO_2$, is put. In this state, a potential difference is applied between an anode electrode 2 and the cathode electrode 3. First, $UO_2$ is reduced to uranium metal. Meanwhile, $ThO_2$ remains as oxide because $ThO_2$ is not reduced with the current molten salt and in the current temperature condition.

After the second electrolytic reduction step S03, the cathode basket 3a, along the substances inside the cathode basket 3a, is taken out, and is transferred to a reactor vessel 1 that contains another molten salt. In this case, the molten salt is a mixture of calcium chloride and calcium oxide; the temperature of the molten salt is about 850 degrees Celsius to about 900 degrees Celsius. In this state, a potential difference is applied between the anode electrode 2 and the cathode electrode 3. As a result, $ThO_2$ is reduced (S01). Uranium remains in a metal state because the uranium has been reduced at the second electrolytic reduction step S03.

In that manner, steps S03 and S01 are carried out.

As the above steps of the present embodiment are carried out, first a uranium oxide and the like are reduced. Then, as the subsequent steps are carried out, a thorium oxide is reduced. Therefore, compared with the case where electrolytic reduction of oxides is performed at once by the first electrolytic reduction step, reduction of a uranium oxide, which is relatively easy to be reduced, and reduction of a thorium oxide, which is relatively difficult to be reduced, are carried out at different steps that provide conditions suitable for each. Therefore, the reduction steps can be efficiently performed.

[Third Embodiment]

Figure 4:
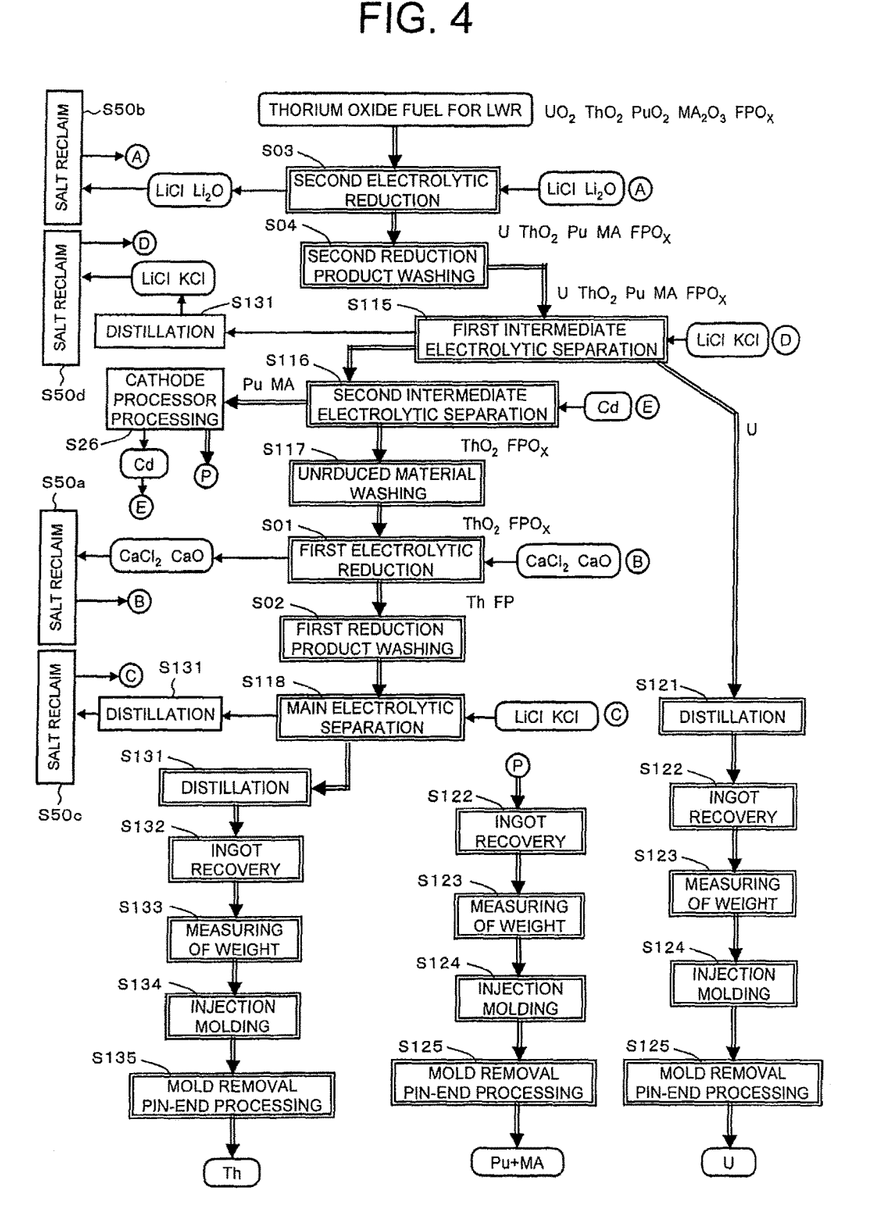
FIG. 4 is a flowchart showing a flow of a process of a method of recovering a nuclear fuel material according to a third embodiment of the invention.

FIG. 4 is a flowchart showing a flow of a process of a method of recovering a nuclear fuel material according to a third embodiment of the present invention. The present embodiment is a variant of the second embodiment: After the second reduction product washing step S04 and before the first electrolytic reduction step S01, electrolytic separation is carried out.

More specifically, after the second reduction product washing step S04, in a molten salt of lithium chloride or potassium chloride, a first intermediate electrolytic separation is carried out (S115). At the second electrolytic reduction step S03, a uranium oxide, plutonium oxide, and MA oxide, which are relatively easy to be reduced, are reduced. At the first intermediate electrolytic separation step S115, uranium is separated among the reduced and refined uranium, plutonium, and MA.

After the first intermediate electrolytic separation step S115, a distillation step S121 is perfomed to carry out distillation of salt, and uranium, which is produced by electrolytic separation at the first intermediate electrolytic separation step S115, is then recovered in the state of an ingot (S122). In order to produce a fuel, the weight of the recovered uranium metal is measured (S123), injection molding is carried out (S124), and a process of mold removal and pin-end processing (S125) is carried out. In this manner, a uranium metal fuel is produced.

After the first intermediate electrolytic separation step S115, a second intermediate electrolytic separation is carried out (S116). In this case, as in the case of the second electrolytic separation of the first embodiment, a cathode electrode is used to carry out electrolytic separation (S26). As a result, plutonium and MA, which have been reduced to metals at the second electrolytic reduction step S03, are separated.

The separated plutonium and MA are recovered in the state of an ingot (S122). The weight of the recovered plutonium and MA is measured (S123), injection molding is carried out (S124), and a process of mold removal and pin-end processing (S125) is carried out. Incidentally, cadmium used is reclaimed by a cathode processor for reuse. A molten salt of lithium chloride and potassium chloride that has been used during the electrolytic separation is reused after being reclaimed by a salt reclaim step (S50d).

After the second intermediate electrolytic separation step S116, a thorium oxide, which has not been reduced, and part of FP oxides, are washed by a non-reduction product washing step (S117).

After the non-reduction product washing step (S117), a thorium oxide, which has not been reduced, and part of FP oxides, are reduced by the first electrolytic reduction step S01, and thorium metal and FP are refined.

The thorium metal that has been refined at the first electrolytic reduction step S01 is washed by the first reduction product washing step S02. After that, at a main electrolytic separation step S118, electrolytic separation of the thorium metal is carried out in a molten salt of lithium chloride and potassium chloride.

The thorium metal that has been separated at the main electrolytic separation step S118 goes through a distillation step S131 before being recovered in the state of an ingot (S132). After the ingot recovery step S132, in order to produce a metal thorium fuel, the weight thereof is measured (S133), injection molding is carried out (S134), and a process of mold removal and pin-end processing (S135) is carried out. As a result, a metal thorium fuel is produced.

Incidentally, the molten salt that has been used at the main electrolytic separation step S118 is distilled, and FP is removed therefrom (S131). After that, the salt is reclaimed (S50c) for reuse.

As described above, according to the present embodiment, after the second electrolytic reduction step S03 at which electrolytic reduction of oxides of uranium, plutonium, and MA is carried out, electrolytic separation of uranium and electrolytic separation of plutonium and MA are sequentially carried out. After the substances are removed, the first electrolytic reduction step S01, which is a reduction step of thorium oxide, is carried out.

According to the present embodiment, the uranium metal, the thorium metal, MA, and the plutonium metal are separated from each other when the above substances are recovered. Therefore, the above substances can be mixed at a predetermined ratio, and a fuel whose concentration has been adjusted can be produced.

Moreover, the substances that have been turned into the state of metal are sequentially separated, and reduction of thorium oxide is then carried out. Therefore, the reaction in the processes is simplified, and there is an increase in reaction efficiency. Moreover, the processing of molten salt is reduced.

[Fourth Embodiment]

Figure 5:
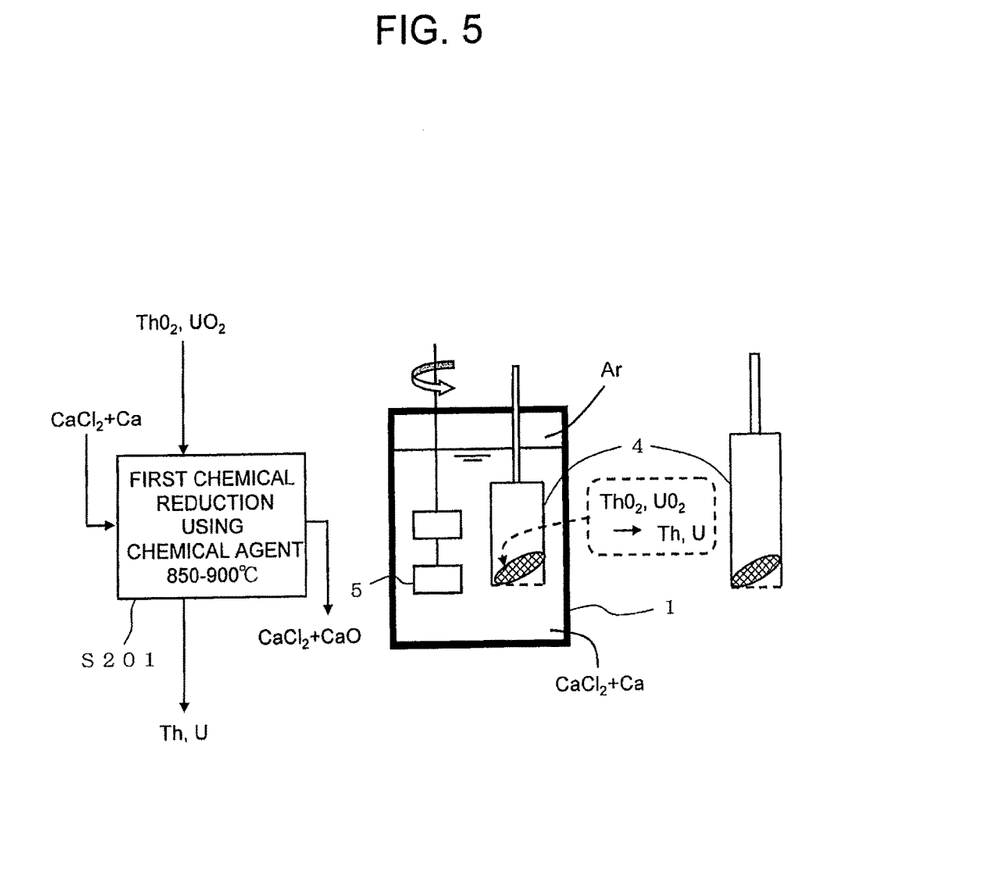
FIG. 5 is a flowchart showing a chemical reduction process of a process of a method of recovering a nuclear fuel material according to a fourth embodiment of the invention, as well as a conceptual cross-sectional view of the inside of a reactor vessel.

FIG. 5 is a flowchart showing a chemical reduction process of a process of a method of recovering a nuclear fuel material according to a fourth embodiment of the present invention, as well as a conceptual cross-sectional view of the inside of a reactor vessel 1.

The present embodiment is a variant of the first, the second or the third embodiment. In this embodiment, instead of the first electrolytic reduction (Step S01) of each of these embodiments, chemical reduction is carried out.

In the reactor vessel 1, a reducing agent (also referred to as a "first chemical reducing agent," hereinafter), in which a mixture of calcium chloride and calcium metal is melted, is put, and is kept at about 850 degrees Celsius to about 900 degrees Celsius. Incidentally, the first chemical reducing agent may contain magnesium metal.

A spent thorium fuel, which is represented by $ThO_2$ and $UO_2$ among other things, is put into a basket 4. A stirring unit 5 is rotated to stir a molten salt and promote a reaction. A molten salt of a mixture of calcium chloride and calcium oxide serves as a reducing agent, and $ThO_2$ and $UO_2$ are reduced. As a result, thorium metal and uranium metal remain in the basket 4 (First chemical reduction step S201).

The other steps are the same as those of the first or third embodiment.

According to the present embodiment described above, the use of the first reducing agent makes it possible to reduce a thorium oxide.

[Fifth Embodiment]

Figure 6:
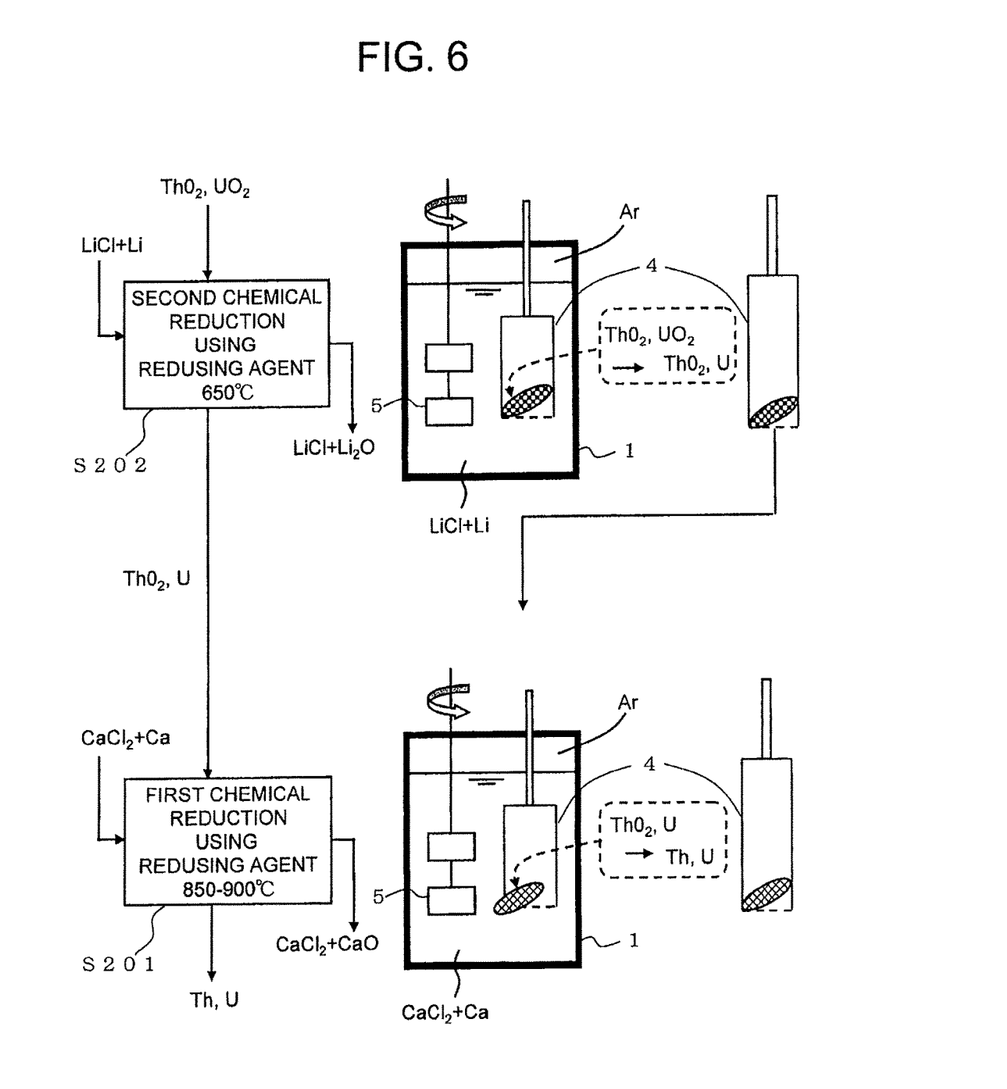
FIG. 6 is a flowchart showing a chemical reduction process of a process of a method of recovering a nuclear fuel material according to a fifth embodiment of the invention, as well as a conceptual cross-sectional view of the inside of a reactor vessel.

FIG. 6 is a flowchart showing a chemical reduction process of a process of a method of recovering a nuclear fuel material according to a fifth embodiment of the present invention, as well as a conceptual cross-sectional view of the inside of a reactor vessel 1. The present embodiment is a variant of the fourth embodiment: Before the first chemical reduction step S201, a second chemical reduction step S202 is added. Moreover, the present embodiment is also a variant of the second or third embodiment: Instead of the second electrolytic reduction (Step S03) of the second or third embodiment, chemical reduction is carried out.

In the reactor vessel 1, a reducing agent (also referred to as a "second chemical reducing agent," hereinafter), in which a mixture of lithium chloride and metallic lithium is melted, is put, and is kept at about 650 degrees Celsius. Incidentally, the second chemical reducing agent may contain at least metallic lithium or metallic potassium.

A spent thorium fuel, which is represented by $ThO_2$ and $UO_2$ among other things, is put into a basket 4. A stirring unit 5 is rotated to stir a molten salt and promote a reaction. A molten salt of a mixture of lithium chloride and metallic lithium serves as a reducing agent, and $UO_2$ is reduced. As a result, thorium dioxide and uranium metal remain in the basket 4 (Second chemical reduction step S202).

After the second chemical reduction step S202, the first chemical reduction step S201 is carried out. However, the present embodiment is different from the fourth embodiment in that, at the first chemical reduction step S201, thorium dioxide and uranium metal are put into the basket 4. The molten salt in the reactor vessel 1, and the temperature of the molten salt are the same as in the fourth embodiment.

According to the present embodiment described above, at the second chemical reduction step S202, first a uranium oxide is reduced. Then, at the first chemical reduction step S201 at which the first chemical reducing agent is used, a thorium oxide can be reduced.

[Sixth Embodiment]

Figure 7:
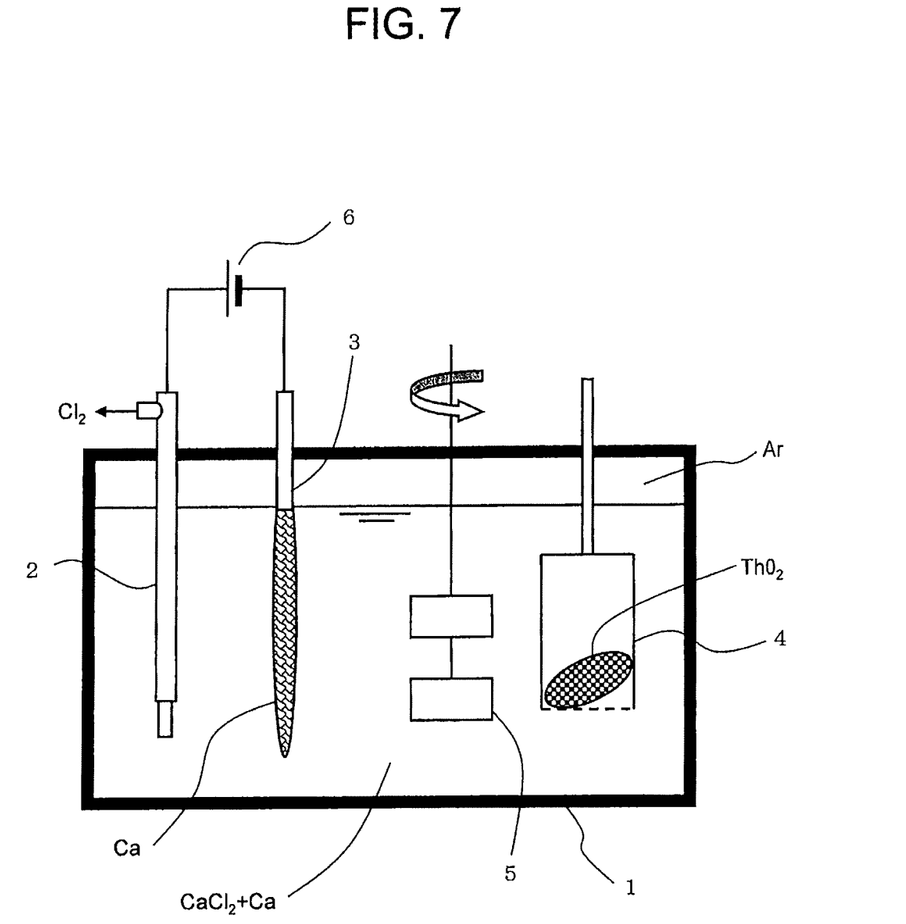
FIG. 7 is a conceptual cross-sectional view of the inside of a reactor vessel, showing an electrolytic reduction process of a process of a method of recovering a nuclear fuel material according to a sixth embodiment of the invention.

FIG. 7 is a conceptual cross-sectional view of the inside of a reactor vessel 1, showing an electrolytic reduction process of a process of a method of recovering a nuclear fuel material according to a sixth embodiment of the present invention. The present embodiment is a variant of the fifth embodiment.

As in the case of the fifth embodiment, in the reactor vessel 1, a first chemical reducing agent, in which a mixture of calcium chloride and calcium metal is melted, is placed. In the reactor vessel 1, the first chemical reduction step S201 is carried out.

In the reactor vessel 1, part of an anode electrode 2 and part of a cathode electrode 3 are immersed. When the first chemical reduction step S201 is not carried out, voltage is applied to both electrodes from a direct-current power source 6. As a result, calcium chloride in the first chemical reducing agent is reduced, and is deposited on the cathode electrode 3. Chlorine gas is generated on the side of the anode electrode 2, and is discharged from an upper portion of the reactor vessel 1.

In that manner, the metal calcium in the first chemical reducing agent can be obtained by electrolytic reduction of the first chemical reducing agent in the same reactor vessel 1 in which the first chemical reduction is carried out.

[Seventh Embodiment]

Figure 8:
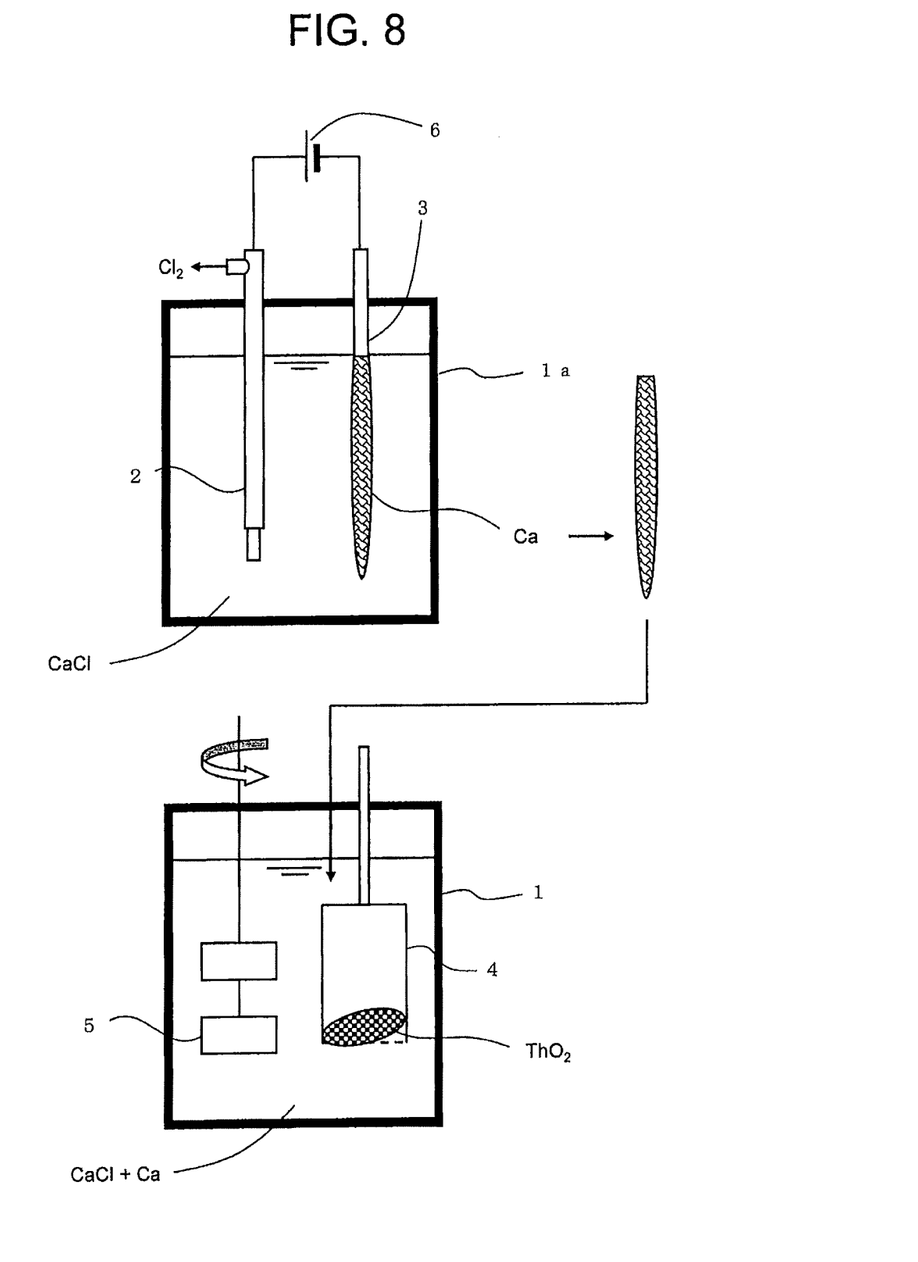
FIG. 8 is a conceptual cross-sectional view of the inside of a reactor vessel, showing an electrolytic reduction process of a process of a method of recovering a nuclear fuel material according to a seventh embodiment of the invention.

FIG. 8 is a conceptual cross-sectional view of the inside of a reactor vessel, showing an electrolytic reduction process of a process of a method of recovering a nuclear fuel material according to a seventh embodiment of the present invention. According to the sixth embodiment, a metallic component in the reducing agent is generated in the same reactor vessel in which the chemical reduction is carried out. However, according to the present embodiment, a reducing agent reduction reactor vessel 1a is used.

That is, the first chemical reduction step is carried out in a reducing agent in which a mixture of calcium chloride and calcium metal is melted in the reactor vessel 1. Thorium dioxide is reduced, and thorium metal is obtained.

The calcium metal in the reducing agent is generated in the following manner: a molten calcium chloride is put into the reducing agent reduction reactor vessel 1a, which is another reactor vessel having an anode electrode 2 and a cathode electrode 3; and voltage is applied from a direct-current power source 6 to reduce the calcium chloride.

According to the present embodiment, the calcium metal, which is generated as described above, is introduced into the reactor vessel 1 for the first chemical reduction. Therefore, a required amount of the reducing agent can be supplied without causing radioactive contamination inside the reducing agent reduction reactor vessel 1a.

[Eighth Embodiment]

Figure 9:
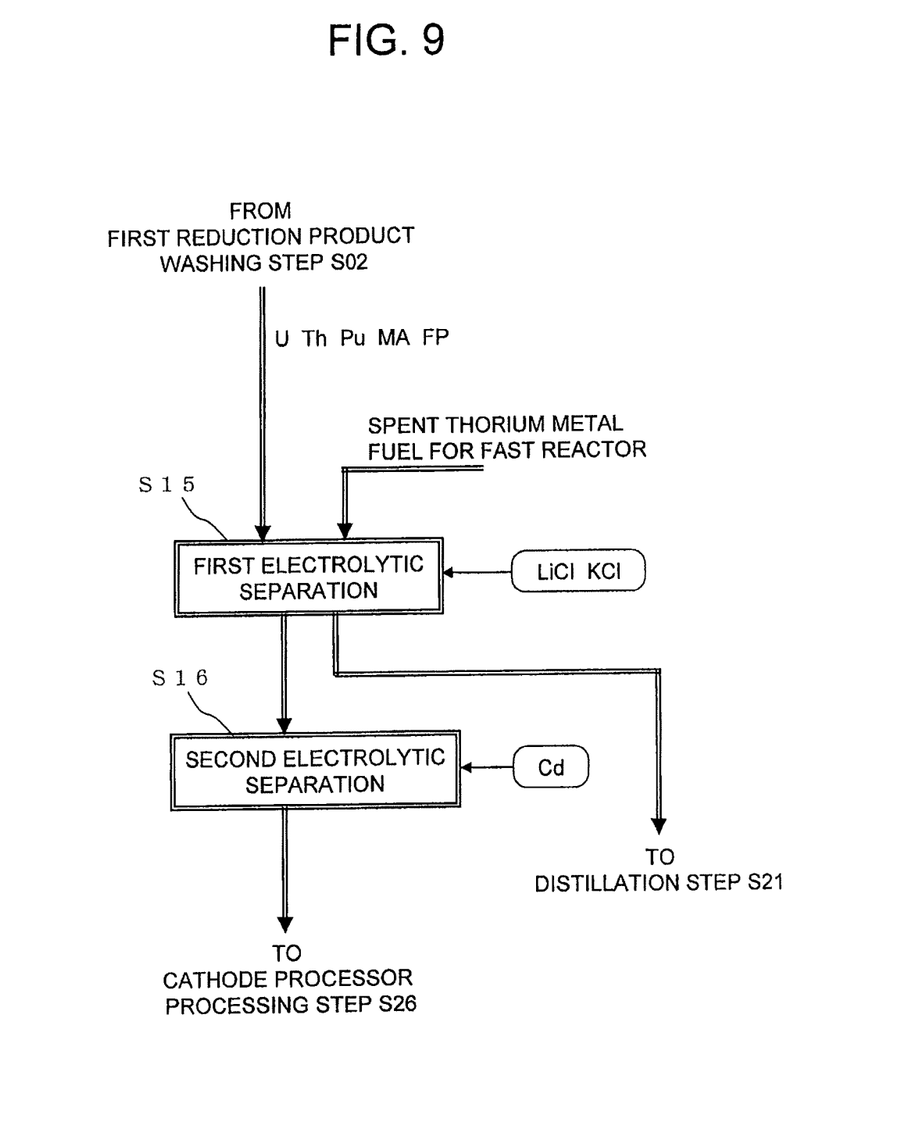
FIG. 9 is a flowchart showing a flow of a process of a method of recovering a nuclear fuel material according to an eighth embodiment of the invention.

FIG. 9 is a flowchart showing a flow of a process of a method of recovering a nuclear fuel material according to an eighth embodiment of the present invention. The present embodiment is a variant of the first embodiment.

According to the first embodiment, at the first electrolytic separation step S15, which comes after the first electrolytic reduction step S01 and the first reduction product washing step S02, electrolytic separation of thorium metal or the like, which has been reduced at the first electrolytic reduction, is carried out. According to the present embodiment, a spent fast-reactor metal thorium fuel, which is taken out from a fast reactor, is added, and is also processed. Accordingly, even from the spent fast-reactor metal thorium fuel, an electrolytically-refined thorium metal is recovered.

Incidentally, the same operation can be carried out even at the first electrolytic separation step S15 of the second embodiment. The same operation can be carried out even at the main electrolytic separation step S118 of the third embodiment.

In this manner, according to the present embodiment, even from a spent fast-reactor metal thorium fuel that is taken out from a fast reactor, an electrolytically-refined thorium metal is recovered.

[Other Embodiments]

The above has described several embodiments of the present invention. However, the embodiments are presented by way of example, and are not intended to limit the scope of the invention. Features of each of the embodiments may be used in combination. For example, the second chemical reduction step and the first electrolytic reduction step may be used in combination.

Furthermore, the embodiments may be implemented in various other forms. Various omissions, substitutions, and changes maybe made without departing from the subject-matter of the invention.

The above embodiments and variants thereof are within the scope and subject-matter of the invention, and are similarly within the scope of the invention defined in the appended claims and the range of equivalency thereof.

What is claimed is:

1. A nuclear fuel material recovery method of recovering a nuclear fuel material comprising thorium metal by reprocessing an oxide of a nuclear fuel material comprising thorium oxide, uranium oxide, plutonium oxide, and minor actinoid oxide in a spent fuel, the method comprising, in the following order:
   (I) chemically reducing the thorium oxide comprised in the spent fuel in a chemical reducing agent that is a mixture of molten calcium chloride and molten metallic calcium, to produce a reaction product comprising thorium metal; and
   (II) electrolytically separating the thorium metal in the reaction product obtained from the chemically reducing (I), in molten salt of lithium chloride, potassium chloride, or a mixed molten salt of lithium chloride and potassium chloride.

2. The method according to claim 1, further comprising, before the chemically reducing (I):
   chemically reducing the uranium oxide comprised in the spent fuel in a chemical reducing agent that comprises at least one selected from the group consisting molten metallic lithium and metallic potassium to produce uranium metal.

3. The nuclear fuel material recovery method according to claim 1, wherein the chemical reduction of the thorium oxide (I) is carried out at about 850° C. to about 900° C.

4. The nuclear fuel material recovery method according to claim 2, wherein the chemical reduction of the uranium oxide is carried out at about 650° C.

* * * * *